United States Patent
Babbitt et al.

[11] Patent Number: 6,053,737
[45] Date of Patent: Apr. 25, 2000

[54] INTELLIGENT FLIGHT TUTORING SYSTEM

[75] Inventors: Bettina A. Babbitt, Redondo Beach, Calif.; Helen Barbara Sorensen, Brooks AFB, Tex.; Herbert Harrington Bell, Mesa, Ariz.; Douglas Shields Elder, Whittier, Calif.; Peter Marston Crane, Mesa, Ariz.

[73] Assignee: Northrop Grumman Corporation, Los Angeles, Calif.

[21] Appl. No.: 08/964,423

[22] Filed: Nov. 4, 1997

[51] Int. Cl.⁷ .................................................. G09B 9/08
[52] U.S. Cl. ................. 434/30; 434/29; 434/43; 434/372; 395/500.29; 706/905; 700/83
[58] Field of Search .................................. 434/29, 30, 35, 434/38, 43, 45, 49, 59, 61, 62, 69, 307 R, 308, 372, 373; 395/500.23, 500.27, 500.29; 705/1, 8, 35, 36; 706/11, 16, 45, 905; 700/17, 83; 701/1, 120; 714/26, 46; 382/181, 190; 345/418, 473, 302, 156, 952; 84/477 R, 601

[56] References Cited

U.S. PATENT DOCUMENTS

| | | |
|---|---|---|
| 4,192,082 | 3/1980 | Deaton et al. . |
| 4,233,756 | 11/1980 | Horwitz . |
| 4,273,536 | 6/1981 | Wick . |
| 4,276,029 | 6/1981 | Gilson et al. ............................. 434/43 |
| 4,424,038 | 1/1984 | Tingleff et al. . |
| 4,645,459 | 2/1987 | Graf et al. ............................ 434/38 X |
| 4,787,024 | 11/1988 | Allsop et al. . |
| 4,949,267 | 8/1990 | Gerstenfeld et al. .............. 395/500.29 |
| 4,959,015 | 9/1990 | Rasinski et al. . |
| 5,051,094 | 9/1991 | Richter et al. ............................ 434/30 |
| 5,117,360 | 5/1992 | Hotz et al. . |
| 5,161,158 | 11/1992 | Chakravarty et al. .................... 714/26 |
| 5,200,901 | 4/1993 | Gerstenfeld et al. ................... 701/120 |
| 5,270,920 | 12/1993 | Pearse et al. ............................... 705/8 |
| 5,311,422 | 5/1994 | Loftin et al. ....................... 395/500.23 |
| 5,370,535 | 12/1994 | Prendergast ................................ 434/45 |
| 5,388,990 | 2/1995 | Beckman ................................ 434/38 |
| 5,428,530 | 6/1995 | Brown et al. . |
| 5,461,571 | 10/1995 | Tran . |
| 5,541,863 | 7/1996 | Magor et al. . |
| 5,651,676 | 7/1997 | Artwick ..................................... 434/43 |
| 5,687,291 | 11/1997 | Smyth ....................................... 706/10 |
| 5,689,619 | 11/1997 | Smyth ....................................... 706/45 |
| 5,728,960 | 3/1998 | Sitrick ................................... 84/477 R |
| 5,774,878 | 6/1998 | Marshall ................................... 705/35 |
| 5,875,108 | 2/1999 | Hoffberg et al. .......................... 700/17 |
| 5,901,246 | 5/1999 | Hoffberg et al. ....................... 382/209 |

OTHER PUBLICATIONS

Northrop Grumman, "Expert System Shells and Intelligent Tutoring Systems: MAUM" by Babbitt, Mar. 1995.
Northrup Grumman, "Assessment of cost and training effectiveness analysis models", Oct. 1989.
Northrup Grumman, "Decision Support System and Training in a Virtual Reality Environment" by Babbitt et al, Jan. 1997.
Northrup Grumman, "The functioning and evaluation of pilot situation awareness" by Erdsley, Apr. 1988.
Northrup Grumman, "Human systems advanced technology: Advanced training system development" by Babbitt et al, Apr. 1994.
Northrup Grumman, "Development of a real-time simulation with intelligent tutoring capabilities" by Gordon et al, 1994.
Northrup Grumman, "Proceedings of the 15th Interservice/Industry Training Systems and Education Conference", Nov. 1993.

*Primary Examiner*—Joe H. Cheng
*Attorney, Agent, or Firm*—Terry J. Anderson; Karl J. Hoch, Jr.

[57] ABSTRACT

A method for tutoring a trainee in a simulator comprises the steps of defining an expert system simulating an activity, and using the expert system to provide instructional feedback to the trainee. The step of defining an expert system comprises constructing a decision support system so as to define a human factors engineering module, programming a plurality of training scenarios, and establishing automated performance measures. The method for tutoring of the present invention eliminates the need to have an expert trainer available and the consequent expense associated therewith.

42 Claims, 3 Drawing Sheets

INTELLIGENT FLIGHT TUTORING SYSTEM

FIELD OF THE INVENTION

The present invention relates generally to both expert systems and aircraft flight simulators. The present invention relates more particularly to an intelligent flight tutoring system for use in aircraft flight simulators and the like wherein automated performance measures are established and are used to facilitate the training of a trainee to higher levels of cognitive skill complexity.

BACKGROUND OF THE INVENTION

Flight simulators for training pilots are well known. Such flight simulators typically provide a somewhat authentic environment within which the trainee sits. The environment, i.e., the cockpit of an aircraft, substantially replicates the cockpit of a real aircraft, such as an F-16. Thus, the trainee may utilize the controls and indicators of the simulator to perform various different procedures and maneuvers without actually endangering either himself or a real aircraft.

The more sophisticated aircraft simulators include a realistic windshield or canopy display which accurately shows the world as it would be seen through the real aircraft's windshield or canopy. Such sophisticated flight simulators typically also use hydraulic positioning controls to change the attitude of the simulator cockpit, so as to realistically simulate attitude changes and accelerations which are sensed by pilots when performing actual maneuvers.

Expert systems are also well known. An expert system is a computer program which is capable of taking into account a large quantity of knowledge and/or reasoning so as to then provide a recommended action. In this manner, an expert system attempts to mimic the responses of an expert. Thus, in many applications, a computer can be utilized in place of an expert, thereby realizing substantial cost, time, space, and weight benefits. For example, such an expert system may be utilized to aid in the diagnosis of medical conditions or to provide legal advice.

The primary distinction between an expert system and a traditional computer algorithm is the expert system's ability to make inferences from very complicated and often incomplete knowledge. Thus, in the same manner that an acceptable answer may be provided by a human expert, once that human expert has been provided with incomplete facts, a properly designed expert system may be constructed so as to provide logical answers from similar information. It is important to note that an expert system provides the best possible answer under the conditions it was written for, but may not provide the best answer under alternative conditions.

Contemporary expert systems typically comprise an explanation portion, a knowledge acquisition portion, a database portion, and a report portion. The explanation portion of a contemporary expert system provides a decision tree which assists a user in determining why a question is being asked or why a particular solution has been identified. The decision tree or explanation model for such a contemporary system can be found in "Leadership and the Decision Making" by Victor Vroom and Philip Yetton, University of Pittsburgh Press, 1971 and also in "The New Leadership-Managing Participation and Organizations", by Victor Vroom and Arthur Yago, Prentice Hall, 1988.

The knowledge acquisition portion of a contemporary expert system queries the user according to a predefined search strategy. First, a solution is assumed, and then the knowledge acquisition portion of the expert system determines if a question response is necessary in order to either approve or disprove the assumed solution. Only questions relevant to the rule are asked. No question is asked unless it is required to reach a solution.

Generally, simple yes or no responses are accepted. Sometimes a question may be answered with a degree of certainty. Fuzzy logic is then utilized in an attempt to find the preferred solution.

The database portion typically comprises abstracts from books and articles involving such topics as, for example, decision making, leadership, and management. The database portion of an expert system typically facilitates reading of the database portion in a non-sequential manner, thus allowing the system to locate the exact information of interest, either by searching on a key word or phrase, or via the use of a browse tree.

The report portion of an expert system typically includes a text editor and the ability to manage filed reports. Prior to report generation, the user is optionally asked if he is willing to risk failure to gain efficiency. As in other questions, a degree of certainty may, optionally, be entered for the response. Thus, a threshold is optionally established beyond which solutions to the desired problems are rejected, when failure is not to be tolerated.

Many contemporary expert systems allow knowledge to be represented as a series of IF-THEN rules. More sophisticated expert systems additionally allow knowledge to be represented as frames. Reasoning is facilitated via both forward chaining and backward chaining. Most contemporary expert systems utilized tools which comprise specific facilities for generating explanations of the expert system's reasoning.

Frequently, expert systems are integrated with other types of software, for example, database management software, a user interface and/or statistical analysis software, so as to create functional integrated control systems suitable for preforming desired tasks.

In view of the advantages of expert systems, particularly their ability to eliminate or mitigate the need for a human expert, it is desirable to provide an aircraft flight simulator which incorporates an expert system so as to provide a methodology for training higher levels of cognitive skill complexity. In this manner, such aircraft flight simulators may be utilized to train pilots to substantially higher skill levels, thereby substantially reducing the expense associated with flight training and also substantially enhancing pilot/aircraft survivability, particularly in complex modern tactical warfare situations.

SUMMARY OF THE INVENTION

The present invention comprises a method for tutoring trainees in aircraft simulators and the like using artificial intelligence methodologies to elicit expert knowledge from experienced pilots and to represent the elicited expert knowledge in a simulation, such as for F-16 radar interpretation.

Although the preferred embodiment of the present invention is described and illustrated herein as being utilized in an F-16 flight simulator, particularly as used in radar interpretation, such description and illustration is by way of illustration only and not by way of limitation. Those skilled in the art will appreciate that the method for tutoring trainees of the present invention may be utilized in various other applications. For example, the present invention may be utilized to instruct automobile drivers, medical students, air traffic controllers, attorneys, etc.

The intelligent flight tutoring system of the present invention comprises an expert system, a simulator for simulating stored flight scenarios, and a feedback circuit for providing instructional feedback for a trainee.

The expert system comprises a decision support system which defines a human factors engineering module, a plurality of stored flight scenarios, and a plurality of automated performance measures.

The decision support system comprises an ability scale applied to a plurality of cognitive abilities. The ability scale rates each of the cognitive abilities according to the number of decisions which are made to preform an associated task. Thus, the more decisions required to perform a particular task, the higher the rating the task's cognitive ability will receive on the ability scale.

Clusters of associated tasks are formed by clustering each task for which its associated ability has been rated above a predetermined level.

Content areas are defined by the clustered tasks and scenarios are then built from the contact areas.

According to the preferred embodiment of the present invention, the ability scale ranges from 1 to 7. The higher the ability scale rating, the more difficult the skill. The clusters preferably comprise tasks having a range from 5 to 7, inclusive.

Preferably, each flight scenario comprises a plurality of different decision points. At least one decision point for each scenario is preferably a decision point wherein an incorrect decision is likely to result in loss of either the pilot or the aircraft.

Each flight scenario preferably commences with predetermined assumptions regarding the distance between the pilot and at least one adversary, as well as predetermined assumptions regarding radar mode, mission time, meteorological conditions, threat access, and threat maneuvers in relation to the distance from a nearest and most threatening advisory.

The automated performance measures preferably comprise standards of performance programmed into each of the scenarios using expert system rules.

The feedback circuit preferably comprises a circuit for monitoring the trainees flight, a circuit for comparing the trainees flight to a decision support system, a circuit for determining how closely the trainees flight resembles an experts flight, and a circuit for presenting feedback to the trainee when the trainee fails to respond in a desired way upon encountering a decision point. The feedback circuit is preferably configured so as to present feedback to a trainee immediately upon following the trainees failed response.

The feedback circuit is also preferably configured to simultaneously present the trainee with a God's eye view of the flight, a radar display of the flight, and text explaining critical decision behaviors of the trainee along with recommendations for improving the trainees performance. The feedback circuit is preferably configured to provide voice instructions to the trainee, preferably via a voice synthesizer.

According to the preferred embodiment of the present invention, the feedback circuit is configured to provide voice cautionaries and detailed voice instructions for correcting the trainee's critical decision behaviors. Optionally, the cautionaries and/or detailed instructions are also provided in written form.

The feedback circuit is also preferably configured to display how an expert would perform the same flight.

The simulator is preferably configured to perform a plurality of flights, each flight being selected at random so as to prevent the trainee from anticipating the next flight.

Preferably the feedback circuit is configured so as not to interfere with the trainee during simulated flight. Thus, the feedback circuit is preferably configured so as to provide instructional feedback only at the end of the simulated flight. Alternatively, the feedback circuit is configured so as to provide feedback during the simulated flight.

According to the preferred embodiment of the present invention, the feedback circuit is configured so as to show the trainee a plurality of expert flights at the end of the simulated flight, thereby providing more detailed training as to the different options available to the trainee.

These, as well as other advantages of the present invention be more apparent from the following description and drawings. It is understood that changes in the specific structure shown and described may be made within the scope of the claims without departing from the spirit of the invention.

DETAILED DESCRIPTION OF THE PREFERRED INVENTION

The detailed description set forth below in connection with the appended drawings is intended as description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The intelligent flight tutoring system of the present invention is illustrated in FIGS. 1 through 6 which depict a presently preferred embodiment thereof.

According to the present invention, an expert system is utilized to facilitate the training of pilots in an aircraft flight simulator. The expert system is formed by questioning experts, i.e., experienced pilots, and then developing a database of the expert's reactions to various different situations. When a trainee uses the simulator, his actions are compared to those of one or more experts and are preferably numerically rated with respect thereto. Thus, a high rating would be given when the trainees actions conform precisely to those of one of the experts, while a low rating would be given when the trainees actions deviate substantially from those of the expert. In this manner, performance feedback can be given to the trainee, so as to help the trainee conform his actions to those of an expert.

Figure 1:
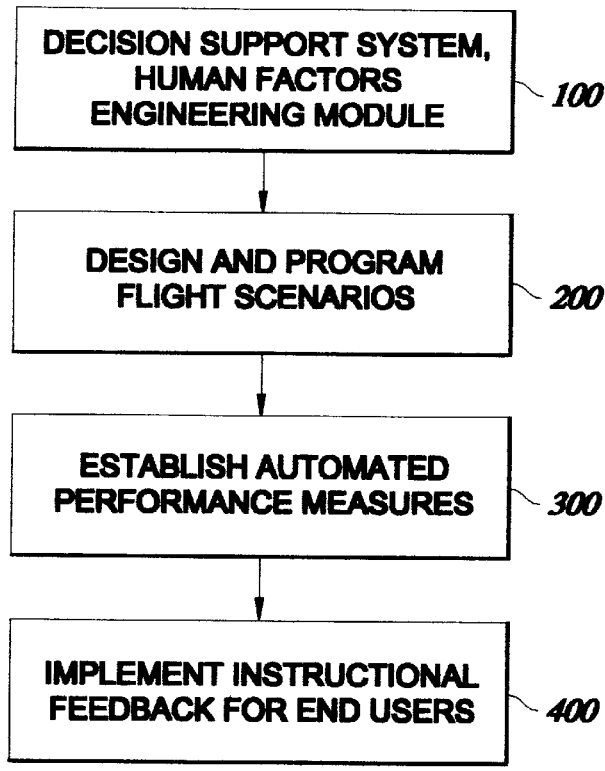
FIG. 1 is a block diagram of the method for tutoring a pilot in an aircraft flight simulator of the present invention.

Referring now to FIG. 1 the intelligent flight tutoring system is constructed by forming a decision support system, human factors engineering module 100, then defining design and program flight scenarios 200. Next, automated performance measures are established 300, and finally instructional feedback for the end users is implemented 400.

Figure 2:
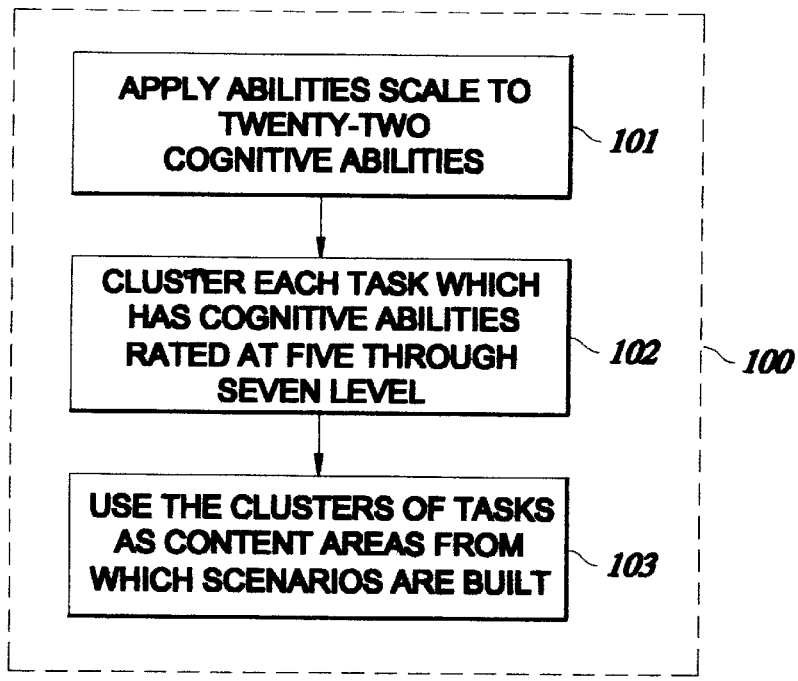
FIG. 2 is a block diagram of the steps associated with providing the decision support system, human factors engineering model of FIG. 1.

Referring now to FIG. 2, forming the decision support system, human factors engineering module 100 comprises the steps of applying an ability scale to a plurality, preferably approximately twenty-two, cognitive abilities 101. As those skilled in the art will appreciate, the number of cognitive abilities to which the abilities scale is applied depends upon the type of simulation to be preformed. Thus, a more complex simulation, requiring the use of more cognitive abilities, will require that an abilities scale be applied to a larger number of cognitive abilities than would a simpler simulation. According to the preferred embodiment of the present invention, the cognitive abilities are rated utilizing a scale of 1 through 7, with 7 requiring the highest degree of cognitive ability.

Preferably, each task which has cognitive abilities rated at a 5 through 7 level are clustered together 102.

The clusters of tasks are then used as content areas from which the scenarios are built 103. In this manner, a plurality of scenarios are defined wherein each scenario requires the use of at least some of those cognitive abilities which are crucial to the performance of the task being simulated.

Figure 3:
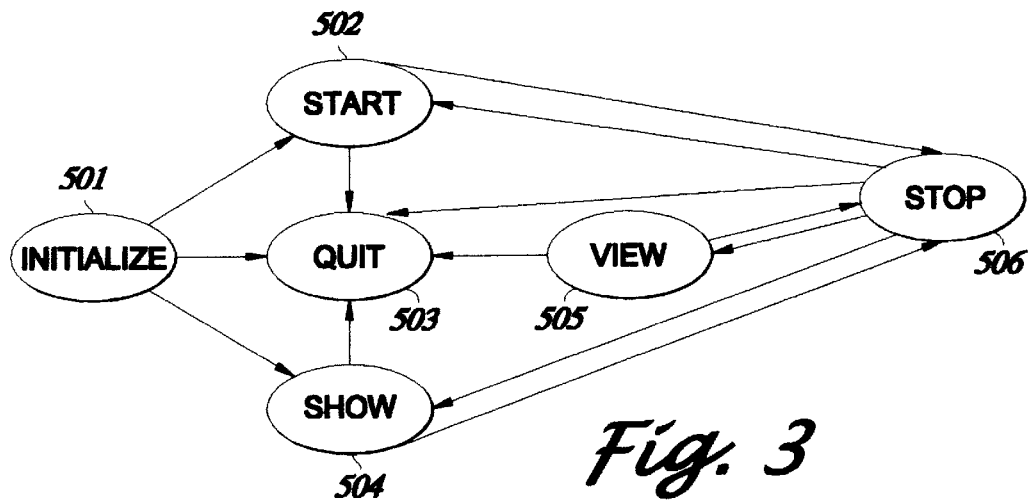
FIG. 3 is a flow chart showing a broad overview of the operation of the system for tutoring a pilot in an aircraft flight simulator according to the present invention.

Referring now to FIG. 3, according to a broad overview of the system operation, the simulator starts 502, and can then be stopped 506 or quit 503. When the simulation is stopped 506, it can be restarted 502. Thus, the simulation may be stopped so as to allow the trainee to contemplate his prior actions and/or decide what to do next. When the simulation is stopped 506 and restarted 502, it resumes at the same place where it was previously stopped 506. Quitting 503 the simulation brings it to a halt, thereby requiring that the simulation be restarted 502 from the beginning.

Initializing 501 the simulation causes all of the desired parameters, i.e., scenario selected, etc. to be entered such that the simulation is performed properly.

Show 504 is an interactive function of the simulation where the trainee is shown those displays and parameters which are a required portion of the simulation. Thus, show 504 typically comprises the showing of a display of a view from the cockpit of the aircraft being simulated, as well as any gauges, controls, indicators, etc., necessary for performance of the simulations. Also, show 504 typically includes the display of the results of actions taken by the trainee, such as the firing of a missile or gun, dropping of bombs, etc.

View 505 comprises the performance analysis, wherein the trainees performance is analyzed and information necessary for training is displayed, as discussed in detail below.

The intelligent flight tutoring system of the present invention this preferably comprises a computer program which creates and initializes the simulation arena; waits for the start 502, show 504, view 505, or quit 503 instructions; commences execution of the flight simulation software and the God's eye view software, and destroys the arena when the simulation is complete.

The smart elements of the expert system, which is a client of the arena, send the start, stop, view, show, and quit instructions, and listen for a quit instruction. The smart elements also read data blocks created by the master of the arena.

The flight simulation software client of the arena can send out a quit instruction and listens for stop and quit instructions and writes host data to the smart elements. Reading of blocked data from the flight simulation software is also performed.

A God's eye view playback client of the arena listens for the stop and quit instructions and responds accordingly.

According to the preferred embodiment of the present invention, a real time system interface is provided wherein each component of the system is independent and can be replaced. Thus, a plug and play system is defined by maintaining compatible data interfaces.

Figure 4:
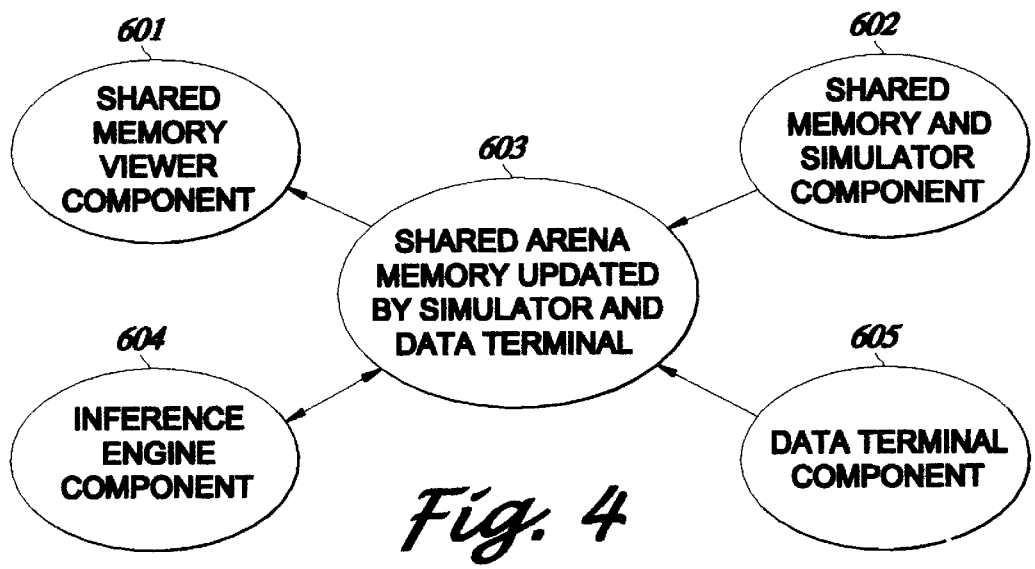
FIG. 4 is a flow chart showing the interrelationships of the various memory components with the inference engine and a data terminal according to the present invention.

Referring now to FIG. 4, the shared area memory component 603 is the hub of the intelligent flight tutoring system and can be thought of as a communications channel. The shared area memory 603 is updated by both the flight simulator and the data terminal component 605. The shared arena memory component 603 is a common place where all of the components can temporarily store or receive data therefrom.

The shared memory viewer component 601 shows such indications as nautical miles, scenarios, critical points, distance, contact, pilot identification to formation, number of bandits, and sorting information for the closest bandit. The shared memory and simulation component 602 is the connection between the shared arena memory and the flight simulator. The shared memory and simulator component 602 transmits nautical mile data to the shared arena memory 603. The inference engine component 604 initializes the shared arena memory 603 and monitors the critical points of the simulation. The inference engine component 604 is capable of shutting down the system and/or starting up a tutoring session, as desired. Thus, when the trainee performs an action which has been determined to be inappropriate, then the inference engine component 604 may halt the simulation and instruct the trainee as to the preferred course of action.

The data terminal component 605 is a mechanism whereby a trainer or training session supervisor may enter the responses indicated by the pilot, such as contact, flight formation, number of planes, and sorted information. Thus, trainer may vary various different aspects of the simulation, so as to provide desired variety as well as specifically desired scenarios.

Figure 5:
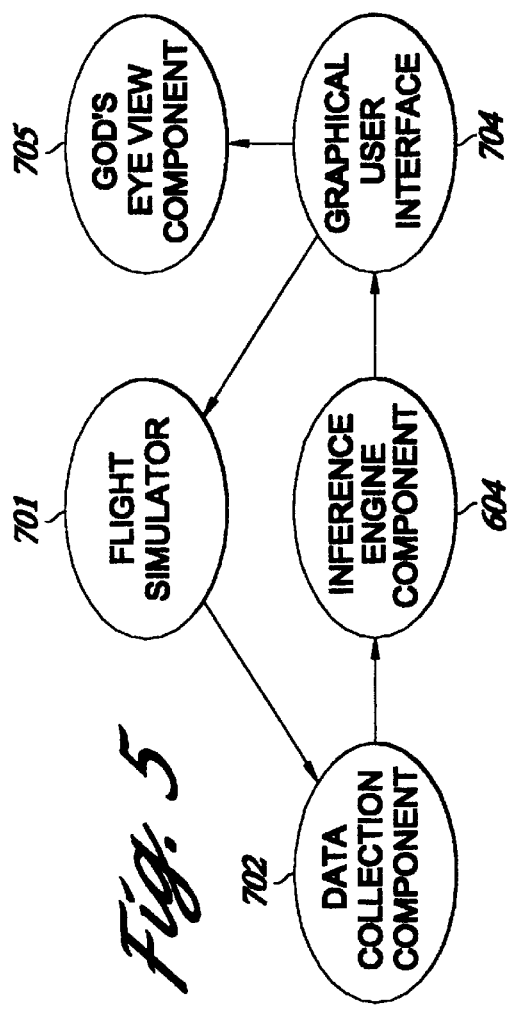
FIG. 5 is a flow chart showing the interrelationship of the flight simulator, data collection component, inference engine component, graphical user interface, and God's eye view component of the present invention.

Referring now to FIG. 5, the performance analysis interface outputs data to the data collection component 702. The data is then passed to the inference engine component 604. The inference engine component 604 reads the data and performs an analysis based upon the rules provided by the substance matter experts, e.g., pilots.

The inference engine component 604 displays the results of the analysis in a format suitable for the trainee utilizing the user displays via the graphic user interface 704. A replay of the flight simulation is also shown to the user. The flight simulation replay is generated by the flight simulator 701. A God's eye view component 705 provides a view of the scenario from above, so that both the trainee's and the bandit's aircraft may easily be seen.

Figure 6:
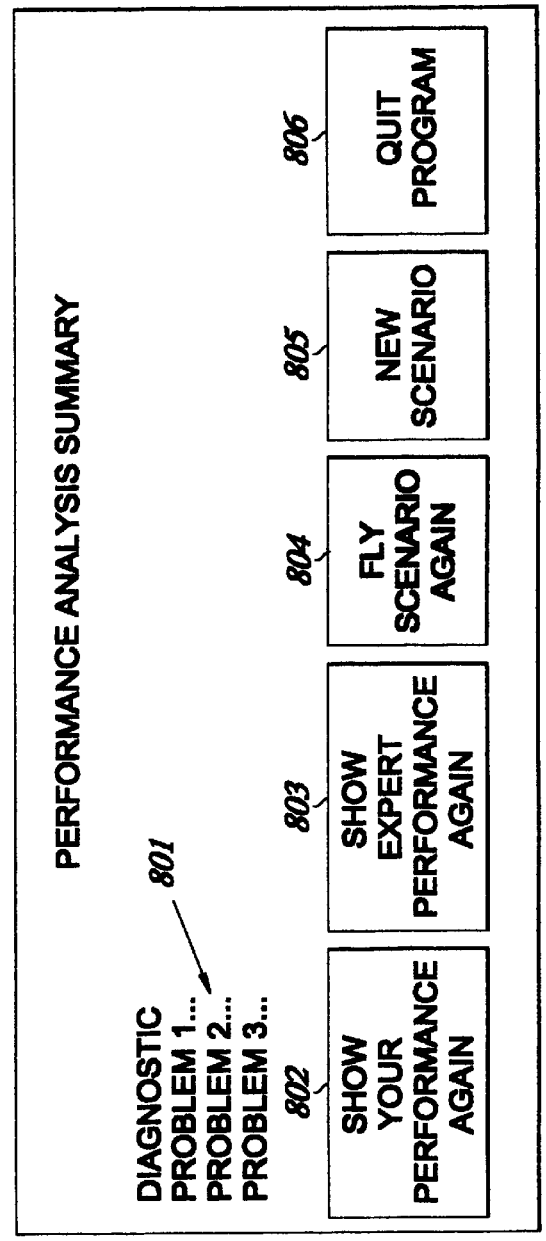
FIG. 6 is an exemplary screen display showing a performance analysis summary according to the present invention.

Referring now to FIG. 6, the performance analysis summary 800 is a screen displayed to the trainee after a flight scenario or simulation has been completed. The performance analysis summary 800 is an example of the graphical user inner face 704. The performance analysis summery 800 provides the trainee with specific diagnostic flight information as well as several feedback options which may be displayed at the push of a touch screen push button 802, 803, 804, 805, or 806.

Thus, the performance analysis summery 800 shows various diagnostics 801, shown as problem 1, problem 2, and problem 3. These problems indicate areas where the trainee deviated from the performance of an expert gearing the simulation.

Activating the "show performance" button 802 facilitates a re-display of the trainees performance on the last simulated scenario. Thus, the trainee may repeatedly review his performance, as desired. The show expert performance again touch screen push button 803 causes the screen to display the training scenario as performed by an expert. optionally, the show expert performance again touch screen push button 803 is followed by a menu which allows the trainee to select how each of a plurality of different experts would fly the scenario. In this manner, the trainee is exposed to a plurality of different options, thereby substantially enhancing the training.

The fly scenario again touch screen push button 804 allows the trainee to repeat the scenario, so as to incorporate the suggestions offered by the intelligent flight tutoring system of the present invention.

The new scenario touch screen push button 805 allows the trainee to select a new scenario. According to the preferred embodiment of the present invention each new scenario will be provided at random, so as to prevent the trainee from anticipating the imminent scenario, thereby more accurately reflecting real world tactical situations. Alternatively, use of the new scenario touch screen push button 805 is followed by a menu which allows the trainee to select one of a plurality of different scenarios.

Using the quick program touch screen push button 806 halts the simulation.

According to the preferred embodiment of the present invention, a voice synthesis system provides a pilot with yellow cautionaries, such that the trainee receives both auditory and text feedback. Such yellow cautionary information preferably deepens, i.e., is provided in greater detail, as necessary. The amount of such feedback may be increased by the trainee, as desired.

According to the preferred embodiment of the present invention a shared memory comprises one block of memory in the form of a common data structure. The data structure is preferably divided into three parts, i.e., a version block, a control block, and a data block.

The version block is initialized by the server and contains the version information that the server was compiled with. The clients compare the data and the version block with their own, report any discrepancies, and take appropriate action. The data in the version block is non-volatile and does not require a lock.

The control block is a repository for sending commands, scenario numbers, and for signalling attachment to the arena. It is protected by an arena lock. A counter in the control block is incremented. Anytime data in the control block has been modified. Clients use this counter to detect changes in the control block.

The data block is the real time communications link between smart elements and the flight simulation soft ware. The data block is protected by an arena lock, and uses the same counter mechanism as the control block for flagging modified data.

Thus, according to the present invention an aircraft flight simulator is provided which incorporates an expert system so as to provide a methodology for training higher levels of cognitive skill complexity. Thus, the intelligent flight simulator of the present invention may be utilized to train pilots to a substantially higher level of skill than heretofore possible. Such training may be accomplished without the presence of a human flight instructor. Such simulator training substantially reduces the expense associated with flight training and also substantially enhances pilot/aircraft survivability, particularly in complex modern tactical warfare situations.

It is understood that the exemplary intelligent flight tutoring system of the present invention describes herein and shown in the drawings represents only a presently preferred embodiment thereof. Indeed, various modifications and additions may be made to such embodiment without departing from the spirit and scope of the invention. For example, the intelligent tutoring system of the present invention may be utilized in various different fields, other than flight simulation. For example, the present invention may be utilized in the training of automobile driving students, medical students (particularly for the training of surgical procedures), air traffic controllers, etc. Thus, these and other modifications and additions may be obvious to those skilled in the art and may be implemented to adapt the present invention for use in a variety of different applications.

What is claimed is:

1. A method for tutoring a pilot trainee in an aircraft flight simulator, the method comprising the steps of:
    a) defining an expert system, the step of defining a expert system comprising:
        (i) constructing a decision support system so as to define a human factors engineering module;
        (ii) programming a plurality of flight scenarios;
        (iii) establishing automated performance measures;
    b) simulating at least one flight; and
    c) using the expert system to provide instructional feedback for the trainee.

2. The method as recited in claim 1, wherein the step of constructing a decision support system comprises:
    a) applying an abilities scale to a plurality of cognitive abilities, the abilities scale rating each of the cognitive abilities according to a number of decisions which are made to perform an associated task;
    b) clustering each task for which its associated ability has been rated above a predetermined level into clusters of associated tasks;
    c) using the clustered tasks to define content areas; and
    d) building scenarios from the content areas.

3. The method as recited in claim 2, wherein
    the step of applying an abilities scale to a plurality of cognitive abilities comprises applying an abilities scale which ranges from one to seven; and
    the step of clustering each task for which its associated ability has been rated above a predetermined level comprises clustering each task having a rating of five to seven, inclusive.

4. The method as recited in claim 1, wherein the step of programming flight scenarios comprises programming a plurality of decision points.

5. The method as recited in claim 4, wherein the step of programming a plurality of decision points comprises programming at least one decision point where an incorrect decision is likely to result in loss of at least one of a pilot and an aircraft.

6. The method as recited in claim 1, wherein the step of programming flight scenarios comprises programming flight scenarios which commence with predetermine assumptions regarding distance between a pilot and at least one adversary, radar mode, mission time, meteorological conditions, threat axis, and threat maneuvers in relation to the distance from the nearest and most threatening adversary.

7. The method as recited in claim 1, wherein the step of establishing automated performance measures comprises programming standards of performance into each of the scenarios using expert system rules.

8. The method as recited in claim 1, wherein the step of using the expert system to provide instructional feedback comprises:
   a) monitoring a flight of the trainee;
   b) comparing the trainees flight to a decision support system;
   c) determining how closely the trainees flight resembles an experts flight; and
   d) presenting feedback to the trainee when the trainee fails to respond in a desired way upon encountering a decision point.

9. The method as recited in claim 8, wherein the step of presenting feedback to the trainee comprises presenting feedback to the trainee immediately following the trainee's failed response.

10. The method as recited in claim 1, wherein the step of providing instructional feedback comprises simultaneously presenting the trainee with:
   a) a God's eye view of the flight;
   b) a radar display of the flight; and
   c) text explaining critical decision behaviors of the trainee along with recommendations for improving the trainees performance.

11. The method as recited in claim 1, wherein the step of providing instructional feedback comprises providing voice instructions to the trainee.

12. The method as recited in claim 11, wherein the step of providing instructional feedback comprises using a voice synthesizer to provide voice instructions to the trainee.

13. The method as recited in claim 1, wherein the step of providing instructional feedback comprises:
   a) providing voice cautionaries; and
   b) providing detailed voice instructions for correcting the trainee's critical decision behaviors.

14. The method as recited in claim 1, wherein the step of providing instructional feedback comprises the steps of:
   a) providing voice cautionaries; and
   b) providing written cautionaries.

15. The method as recited in claim 1, wherein the step of providing instructional feedback comprises displaying how an expert would have performed the same flight.

16. The method as recited in claim 1, wherein the step of simulating at least one flight comprises simulating a plurality of flights, each flight being selected at random so as to prevent the trainee from anticipating the next flight.

17. The method as recited in claim 1, wherein the instructional feedback is invisible to the trainee during the simulated flight.

18. The method as recited in claim 1, wherein the step of providing instructional feedback comprises providing instructional feedback at the end of the simulated flight.

19. The method as recited in claim 1, wherein the step of providing instructional feedback comprises providing instructional feedback during the simulated flight.

20. The method as recited in claim 1, wherein the step of providing instructional feedback comprises showing the trainee a plurality of expert flights at the end of the simulated flight.

21. An intelligent flight tutoring system for tutoring pilot trainees, the intelligent flight tutoring system comprising:
   a) an expert system, the expert system comprising:
      (i) a decision support system defining a human factors engineering module;
      (ii) a plurality of stored flight scenarios;
      (iii) a plurality of automated performance measures;
   b) a simulator for simulating the stored flight scenarios; and
   c) a feedback circuit for providing instructional feedback to the trainee.

22. The intelligent flight tutoring system as recited in claim 21, wherein the decision support system comprises:
   a) an abilities scale applied to a plurality of cognitive abilities, the abilities scale rating each of the cognitive abilities according to the number of decisions which are made to perform an associated task;
   b) clusters of associated tasks formed by clustering each task for which its associated ability has been rated above a predetermined level;
   c) content areas defined by the clustered tasks; and
   d) scenarios built from the contact areas.

23. The intelligent flight tutoring system as recited in claim 22, wherein;
   the abilities scale ranges from one to seven; and
   the clusters comprise tasks having a rating of five to seven, inclusive.

24. The intelligent flight tutoring system as recited in claim 22, wherein the flight scenarios comprise at least one decision point where an incorrect decision is likely to result in loss of at least one of the pilot and the aircraft.

25. The intelligent flight tutoring system as recited in claim 21, wherein the flight scenarios comprises a plurality of decision points.

26. The intelligent flight tutoring system as recited in claim 21, wherein the flight scenarios commence with predetermine assumptions regarding distance between a pilot and at least one adversary, radar mode, mission time, meteorological conditions, threat axis, and threat maneuvers in relation to the distance from a nearest and almost threatening adversary.

27. The intelligent flight tutoring system as recited in claim 21, wherein the automated performance measures comprise standards of performance programmed into each of the scenarios using expert system rules.

28. The intelligent flight tutoring system as recited in claim 21, wherein the feedback circuit comprises:
   a) a circuit for monitoring the trainees flight;
   b) a circuit for comparing the trainees flight to a decision support system;
   c) a circuit for determining how closely the trainees flight resembles an experts flight; and
   d) a circuit for presenting feedback to the trainee when the trainee fails to respond in a desired way upon encountering a decision point.

29. The intelligent flight tutoring system as recited in claim 28, wherein the feedback circuit is configured to present feedback to the trainee immediately following the trainee's failed response.

30. The intelligent flight tutoring system as recited in claim 21, wherein the feedback circuit is configured to simultaneously present the trainee with:

a) a God's eye view of the flight;
b) a radar display of the flight; and
c) text explaining critical decision behaviors of the trainee along with recommendations for improving the trainees performance.

31. The intelligent flight tutoring system as recited in claim 21, wherein the feedback circuit is configured to provide voice instructions to the trainee.

32. The intelligent flight tutoring system as recited in claim 31, wherein the feedback circuit comprises a voice synthesizer for providing voice instructions to the trainee.

33. The intelligent flight tutoring system as recited in claim 21, wherein the feedback circuit is configured to:
a) provide voice cautionaries; and
b) provide detailed voice instructions for correcting the trainee's critical decision behaviors.

34. The intelligent flight tutoring system as recited in claim 21, wherein the feedback circuit further comprises:
a) a circuit for providing voice cautionaries; and
b) a circuit for providing written cautionaries.

35. The intelligent flight tutoring system as recited in claim 21, wherein the feedback circuit is configured to displaying how an expert would have performed the same flight.

36. The intelligent flight tutoring system as recited in claim 21, wherein the simulator is configured to simulate a plurality of flights, each flight being selected at random so as to prevent the trainee from anticipating the next flight.

37. The intelligent flight tutoring system as recited in claim 21, wherein the feedback circuit is configured so as not to interfere with the trainee during the simulated flight.

38. The intelligent flight tutoring system as recited in claim 21, wherein the feedback circuit is configured to provide instructional feedback at the end of the simulated flight.

39. The intelligent flight tutoring system as recited in claim 21, wherein the feedback circuit is configured to provide instructional feedback during the simulated flight.

40. The intelligent flight tutoring system as recited in claim 21, wherein the feedback circuit is configured to show the trainee a plurality of expert flights at the end of the simulated flight.

41. A method for tutoring a trainee in a simulator, the method comprising the steps of:
a) defining an expert system, the step of defining a expert system comprising:
(i) constructing a decision support system so as to define a human factors engineering module;
(ii) programming a plurality of training scenarios;
(iii) establishing automated performance measures;
b) simulating an activity; and
c) using the expert system to provide instructional feedback to the trainee.

42. An intelligent tutoring system for tutoring trainees, the intelligent tutoring system comprising:
a) an expert system, the expert system comprising:
(i) a decision support system defining a human factors engineering module;
(ii) a plurality of stored training scenarios;
(iii) a plurality of automated performance measures;
b) a simulator for simulating the stored training scenarios; and
c) a feedback circuit for providing instructional feedback to the trainee.

* * * * *